Aug. 4, 1936.  J. E. GRAF ET AL  2,050,053
STRIP HANDLING
Filed Feb. 13, 1933
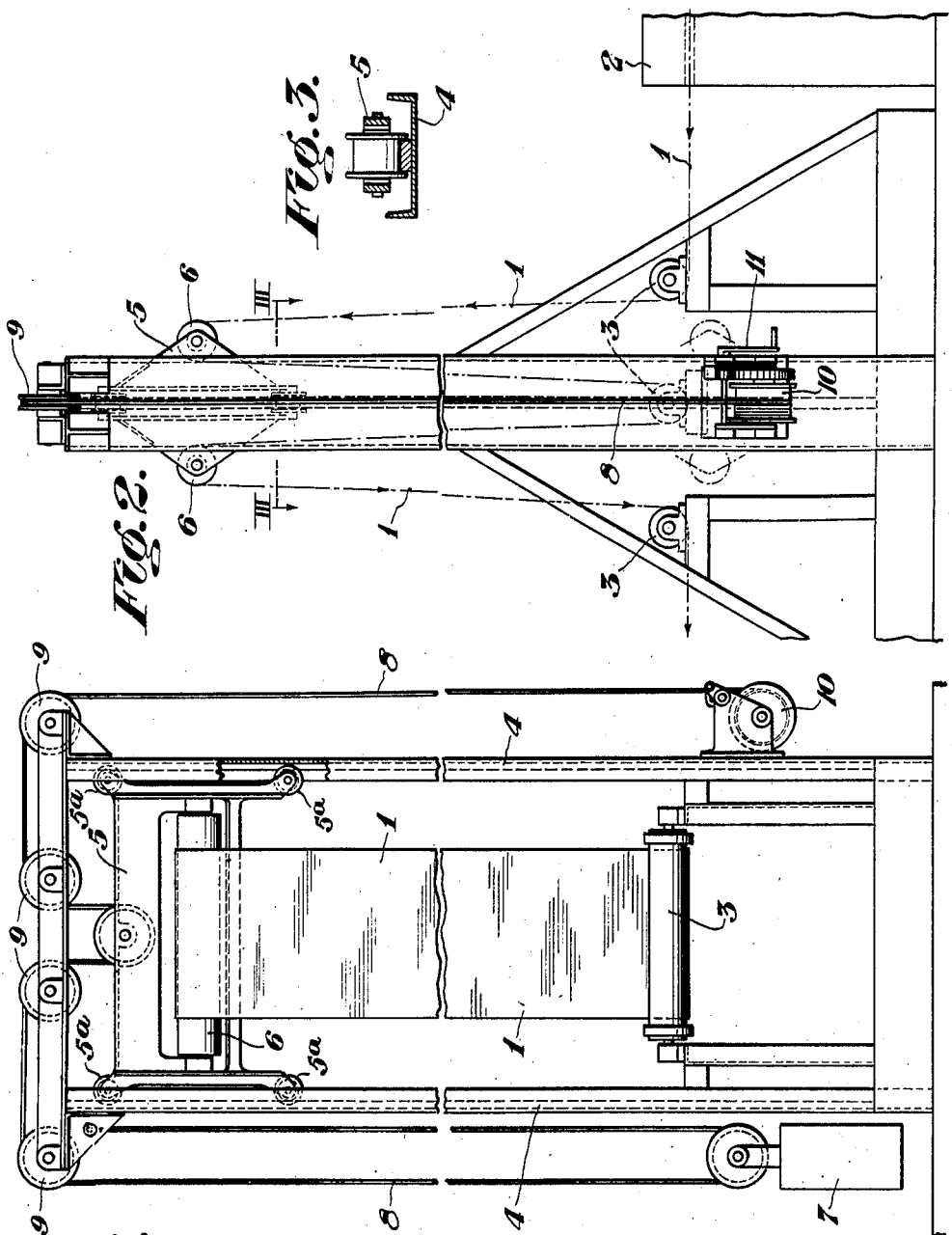
Inventors:
JULIUS E. GRAF and
EDWIN T. LORIG.
by: Marvin T. Rauber
their Attorneys.

Patented Aug. 4, 1936

2,050,053

UNITED STATES PATENT OFFICE 2,050,053

STRIP HANDLING

Julius E. Graf, Avalon, Pa., and Edwin T. Lorig, Gary, Ind., assignors to American Sheet and Tin Plate Company, a corporation of New Jersey Application February 13, 1933, Serial No. 656,632

2 Claims. (Cl. 271—2.1)

This invention relates to a method and machine for handling strip, and particularly continuously moving metal strip. One of the objects is to enable the momentary stoppage of a portion of continuously moving strip material so that work may be done thereon. For instance, continuously moving metal strip must sometimes be stopped to permit the interfastening of loose ends, inspection, etc. Another object is to provide a simple and sturdy machine which will so handle strip as to permit such momentary stoppage and which may be used in conjunction with various machines which must perform work on the strip while the latter is stationary. Other objects may be inferred from the following illustrated disclosure of a specific form of the invention.

Referring to the drawing,

Figure 1 is a front elevation.

Figure 2 is a side elevation.

Figure 3 is a horizontal cross-section taken from the line III—III in Figure 2.

This drawing illustrates a continuously moving wide metal strip 1 which is passed by a welding machine 2. When the end of one strip section is reached this welding machine clamps it so that the end of another may be affixed thereto by the machine.

This operation customarily requires the momentary stoppage of the strip. Ordinarily, this is not desirable, as the strip may be threaded through an annealing furnace, for instance, where it would be badly burned if left for a longer period than that normally required for annealing. The strip might also be immersed in a pickling bath, where too long a stay might unduly corrode the metal surface.

In the present instance, spaced rollers 3 are arranged so their under surfaces are alined with the strip 1. A frame 4 extends upwardly from these rollers, and a carriage 5 runs thereon. This carriage carries rollers 6 which are spaced to pass between the rollers 3 when the carriage 5 moves thereby.

The carriage 5 is normally urged upwardly by a counterweight 7 which is connected thereto by a cable 8 which passes over pulleys 9 fixed to the frame 4. Preferably, the cable 8 is passed down over the other side of the frame and an excess wrapped on a drum 10 manually driven by a geared crank 11. When the crank is turned this excess of cable is introduced to the working portion, which will permit the carriage 5 to drop downwardly so that the rollers 6 are brought below the level of the rollers 3. Other means for urging the carriage 5 upwardly may be used, where convenient. This also applied to the arrangement for raising and lowering the carriage 5.

In use, the carriage 5 is dropped so that the upper surfaces of the rollers 6 is below the level of the under surfaces of the rollers 3. The strip 1 may then be threaded directly through the pass formed by these rollers and continued on into its processing apparatus.

As the strip starts, the crank 11 is turned so that the excess of the cable 8 is taken up and the carriage 5 rises. The rollers 6 then raise the strip 1 upwardly in the form of loops, which are maintained taut by means of the counterweight 7. Preferably, the cable is adjusted so that the carriage 5 normally rides close to the top of the frame.

When it is time for the operation of the welding machine 2 the clamps on the machine are operated, which stops the strip 1. Then, while the work is being performed on this end the remainder of the strip may continue to feed because of the excess provided by the loops maintained by the rollers 6 on the carriage 5. During this operation the carriage 5 is drawn downwardly and acts as a visual indication of the amount of material remaining for feeding purposes, so that the operator of the welding machine may limit his time accordingly. In case the stoppage must be for a relatively long period, the machine described may be constructed to form more loops than indicated.

As previously mentioned, the machine is particularly applicable when used in connection with a welding machine, or any other type of end interfastening machine, because it is practically impossible to fix the terminating end of one strip section to the leading end of another on the fly. Also, the invention is especially useful for use with wide metal strip because of the difficulty in handling this by ordinary means. This material generally has a highly finished surface which is easily marred by contact with the floor or by kinking. Therefore, the carriage 5 has spaced wheels 5a at either end which run on the frame 4 to prevent canting of the carriage, and the rollers 6 are mounted by the carriage parallel to the fixed rollers 3. Any deviation from this parallel relationship results in the kinking mentioned, since the inflexible material maintains a point contact with a canted roller so that the longitudinal pull throws the strip to a concave form with a consequent longitudinal kinking.

The welding machine 2 has not been specifically described, because its construction is immaterial to the present invention. For the same reason the various processing or finishing machines through which the strip passes has not been indicated. In connection with this last, however, it is to be noted that this machinery will include a pair of pinch rollers or other pull-out mechanism at some point which draws the strip continually along.

Although a specific form of this invention has been shown and described in accordance with the patent statutes, it is not intended to limit the scope of the invention exactly thereto, except as defined by the following claims.

We claim:

1. A machine including the combination of a plurality of spaced substantially alined fixed rollers, a frame extending from said fixed rollers, a carriage arranged on said frame for movement away from said fixed rollers and also to a point beyond the other side thereof, one or more rollers arranged on said carriage for passage between said fixed rollers, said carriage having spaced wheels at either end which run on said frame to prevent canting of said carriage, and said one or more rollers being mounted by said carriage parallel to said fixed rollers, a counterbalance, a cable interconnecting said carriage and counterbalance and arranged to cause the latter to urge the former towards the limits of said frame away from said fixed rollers and means for varying the length of said cable to permit movement of said carriage independently of said counterbalance's movement.

2. Apparatus for handling moving metal strip, including tandem rollers arranged so the moving metal strip to be handled may contact therewith, a movable roller, means for mounting said movable roller for movement through the space between said tandem rollers from a position spaced sufficiently to one side of the latter to allow said strip to pass therebetween to positions spaced varying distances on the other side of said tandem rollers, means for urging said movable roller away from its first named position toward its other positions with sufficient force to cause it to carry said metal strip along therewith when said metal strip is between it and said tandem rolls, and means for positively moving said movable roller to its first named position so that said metal strip may thread between it and said tandem rollers without bending, said tandem rollers being parallel and the first named means positively holding said movable roller parallel said tandem rollers at all times.

JULIUS E. GRAF.
EDWIN T. LORIG.